United States Patent Office 3,524,822
Patented Aug. 18, 1970

3,524,822
PROCESS FOR WASHING AND REMOVING CATALYST FINES FROM A BED OF SOLID CATALYST PARTICLES IN A REACTOR
John H. Frankovich and Donald K. Wunderlich, Chicago, and Robert L. Foster, Homewood, Ill., assignors to Sinclair Research, Inc., New York, N.Y., a corporation of Delaware
No Drawing. Filed Sept. 11, 1967, Ser. No. 666,998
Int. Cl. B01j *11/168*
U.S. Cl. 252—416        11 Claims

ABSTRACT OF THE DISCLOSURE

Catalyst fines or dust including fine iron particles and other impurities are removed from an in place catalyst bed by simultaneously passing liquid cleansing fluid, such as water, and a gas, such as air, concurrently upwardly through the catalyst bed at such a rate as to cause at least a small expansion of the catalyst bed, thereby effecting intimate contact between the catalyst and the cleansing fluid to wash away the catalyst fines.

---

This invention relates to removal of catalyst fines or dust including fine iron particles and other impurities from an in place catalyst bed. More particularly this invention relates to an improved process for washing catalyst fines from a catalyst bed in place in a reactor and restoring the catalyst bed to an effective condition.

It has been known for many years that small quantities of impurities deleteriously affect many solid catalysts and catalyst carriers in such characteristics as activity, stability, and specific reaction promotion properties. Fine particles of metal oxides can, for example, build up in solid catalyst beds upon processing of heavy oil feedstocks. A similar situation can occur in catalytic reformer reactors due to rust and scale carried from feed lines and preheaters. This fine material can lead to excessive pressure drops during processing, may catalyze undesirable side-reactions, and in general can adversely affect the over-all efficiency of the system.

Various methods have been utilized heretofore for removing such impurities as fines from solid catalysts and catalyst carriers both during their manufacture and after they have become contaminated during use. Some of these methods involve treatment with chemical reagents including thorough washing. Other separation methods rely upon the selective removal of contaminating material by magnetic means, by screening or by settling using various liquid separating media. However, all of these methods have inherent disadvantages and have attained only limited commercial use.

In accordance with the present invention, an improved method for washing impurities from an in place catalyst bed has been discovered in which the bulk of catalyst fines or dust including fine iron particles in a catalyst bed is removed by simultaneously passing a liquid cleansing fluid and a gas concurrently upwardly through the catalyst bed at such a rate that at least a small increase in bed volume expansion occurs. This incipient or slight catalyst bed expansion insures effective intimate contact between the catalyst in said bed and the cleansing fluid thus facilitating removal of impurities from the catalyst bed and from the system.

The process of this invention greatly extends the periods between shutdown for catalyst replacement and substantially improves the activity as well as selectivity of the various catalysts during use. In the present invention an inert liquid-gas combination, for example, water and air, is used to clean the catalyst bed. The use of a liquid alone is not as effective as the liquid-gas combination of the present invention and also causes permanent expansion of the catalyst bed, that is, the bed does not resettle to its initial level after expansion. This permanent expansion of the catalyst bed can be as high as 5% and in some cases even higher.

The in place cleansing process of this invention is applicable to any contaminated catalyst system, such as catalysts used in converting hydrocarbon stocks, especially in hydrotreating or hydrogenating processes at elevated temperatures of about 500 to 1000° F., and can often be used to wash out impurities, such as particles of metal or metal oxides, e.g. iron or iron oxide or other catalyst fines from the bed. Exemplary of such catalyst systems are hydrogenating catalysts, conventionally employed in the hydrogenation of crude petroleum oils, e.g. nickel molybdate, cobalt molybdate, platinum, etc. on cracking or non-cracking bases, such as silica-alumina or alumina, respectively. These catalysts compositions can be formed into macrosize particles, preferably by extrusion, to give a catalyst of good porosity. The macrosize particles have diameters of about $\frac{1}{32}$ to $\frac{1}{4}$ inch, preferably about $\frac{1}{16}$ inch and lengths of about $\frac{1}{32}$ inch or $\frac{1}{16}$ inch up to about ½ inch or more. Other catalyst systems which can be cleansed by the present process include the conventional cracking catalysts and hydrocracking catalysts.

All of these catalysts can be supported in fixed beds in the reactor as well known in the art.

In general, it may be desirable or important that the catalyst bed treated in accordance with the present invention be first regenerated with air and substantially freed from fresh carbonaceous deposits, as fresh carbon deposits may interfere with the in place washing process. However, it should be understood that the catalyst need not be entirely free of all carbon and that the invention can be applied to regenerated catalysts from commercial units containing on the average as much as about one percent by weight of carbon, although the final activity of the catalyst is generally improved by further regeneration of the catalyst to reduce the average carbon content. Excessive amounts of carbon deposits are, of course, detrimental because they render the contaminants, such as iron or iron oxide inaccessible to the water and gas cleansing treatment.

As previously stated the process of the present invention is utilized for removing fine particle impurities from a catalyst bed produced after a period of processing or after regeneration of the catalyst. After regeneration, the catalyst bed will generally be found to contain fine particles of impurities such as, for example, iron dust which contaminates and restricts further catalyst bed effectiveness. In a specific operation the regenerated catalyst bed which may be at a temperature of about 650 to 800° F. can be first cooled by injecting an inert gas into the bottom of the reactor and up through the catalyst bed therein. The temperature of the catalyst bed as such is not important except that it should not be so high as to vaporize the cleansing fluid. Thus, for example, where the cleansing liquid is water, the catalyst bed is desirably cooled to less than about 200° F.

In general, in the present invention, cleansing liquid, together with a continuous flow of gas, is injected into the lower part of the reactor or vessel containing the contaminated catalyst bed. The flow of liquid and gas is concurrent upwardly through the catalyst bed. The reactor eventually fills with this liquid which together with the gas passes as overhead from the reactor to the sewer or to an open settler where the particles of impurities can be removed before the liquid is rejected or recycled. The simultaneous injection of gas and liquid in concurrent upward flow through the catalyst bed is continued for a sufficient length of time until the bed is washed clean and the impurities substantially removed, as judged by the appearance of the liquid coming overhead from the reactor. When the catalyst bed is cleansed, the liquid flow is shut off before the gaes flow to prevent permanent bed expansion. However, the catalyst bed is resettled by continuing the gas flow through the liquid-containing catalyst bed before the liquid in the bed is drained off from the reactor. After resettling, the catalyst bed is thoroughly drained and a gas, such as air, is introduced into the top of the reactor downflow through the catalyst bed and the temperature of this gas, is gradually raised to the processing temperature, e.g. about 600 to 800° F., to dry the catalyst before resuming processing. In situations where very long catalysts beds are involved, the volume change in gas due to the hydrostatic pressure may result in uneven bed expansion, i.e., the bottom of the bed might not be expanded at all. This can readily be overcome by operating at higher pressures so that the total pressure drop becomes an acceptably low percent of the total pressure.

The cleansing medium, which is a combination of a liquid and a gas, is generally water and air although any liquid or gas which has the same properties for catalyst cleansing purposes as water and air and is inert to the catalyst bed being treated can be used in the present process. During the cleansing process, the top of the reactor is generally maintained at a pressure of about 0 to 1000 p.s.i.g., preferably about 0 to 200 p.s.i.g., and the bed temperature is maintained between about ambient temperature and 500° F., preferably from about ambient temperature to about 200° F. The rate of cleansing fluid necessary to cause incipient bed expansion will of course vary from bed to bed and can be controlled by varying the water mass and gas volume superficial velocity. The cleansing fluid velocity is chosen to produce a bed expansion of about 1 to 20%, preferably about 1 to 10%, with the gas volume superficial velocity at the reactor outlet generally between about 0.5 to 10 ft.$^3$/min./ft.$^2$, preferably about 1 to 4 ft.$^3$/min./ft.$^2$ and the water mass generally from about 1,000 to 20,000 pounds per hour per square foot, preferably about 4,000 to 12,000 pounds per hour per square foot of catalyst bed.

The process of this invention is further illustrated by the following examples.

EXAMPLE I

A bed of ⅛" x 3/16" hydrocracking catalyst cylinders which had been used for hydrocracking asphalts and subsequently regenerated was found to be severely contaminated with iron dust particles. Samples of this catalyst from the reactor were used to fill a 1" tube to a bed height of about 20". Bed characteristics were determined by passing air and water upflow through the catalyst bed and noting the liquid mass velocity and air flow rates corresponding to the resulting catalyst bed expansion. Very little bed expansion occurred until the liquid mass velocity reached about 4000 pounds per hour per square foot. The range of liquid mass velocity from about 4,000 to 12,000 pounds per hour per square foot and gas superficial velocity from about 1 to 4 ft.$^3$/min./ft.$^2$ (cubic feet per minute per square foot of catalyst bed) was determined to be the region of incipient bed expansion within the range of 1 to 10%.

EXAMPLE II

To illustrate the value of the present invention, two comparative runs were made in which identical beds of catalysts contaminated by iron powder were washed. In one run, a combined stream of air and water was used in accordance with the process of this invention. In the other run, water alone was used as the cleansing agent. In both runs, the rates of velocity were chosen to give a bed expansion of 10%. The results are tabulated in the table below.

TABLE

| | Water mass velocity, lbs./hr./ft.$^2$ | Air velocity, ft.$^3$/min./ft.$^2$ | Percent iron | Crush strength, lbs. |
|---|---|---|---|---|
| Unwashed | | | 0.715 | 8.6 |
| Air-water | 10,500 | 4 | 0.220 | 9.0 |
| Water only | 18,000 | 0 | 0.356 | 8.3 |

The catalyst washed with water alone still contained 0.356% iron and was still very red in color. In contrast, the catalyst washed with water and air in accordance with the present invention, contained only 0.220% iron, was completely free of dust and was very close to its natural color. The presence of air made the system considerably more turbulent and allowed resettling of the bed to its initial position. As shown by the above table, the catalyst crush strength after air-water wash according to the present invention was 9.0 which was essentially unchanged from the initial crush strength of 8.6. The best iron dust removal was achieved with the air-water wash of this invention and this improved wash with air-water was realized at a much lower water rate than was used with water alone.

It is claimed:

1. A process for washing and removing catalyst fines from a bed of solid particles of a catalyst for conversion of hydrocarbons in a reactor while said bed of solid catalyst particles is in place in the reactor, which comprises simultaneously flowing a gas and a liquid cleansing fluid concurrently upwardly through said bed of solid catalyst particles in place in the reactor at a rate sufficient to cause an expansion of said catalyst bed within the range of about 1 to 20 percent by volume, thereby intimately contacting the catalyst particles in said bed with liquid cleansing fluid and washing away catalyst fines, said liquid-gas combination being inert to said catalyst bed, and wherein the flow of liquid cleansing fluid upwardly through said bed of solid catalyst particles is at a mass velocity of about 1,000 to 20,000 pounds per hour per square foot of catalyst bed and the flow of gas concurrently upwardly through said bed of solid catalyst particles is at a volume velocity at the reactor outlet of about 0.5 to 10 cubic feet per minute per square foot of catalyst bed.

2. The process of claim 1 wherein the catalyst particles have diameters of about 1/32 to ¼ inch and lengths of about 1/32 to ½ inch.

3. The process of claim 2 wherein the bed of solid catalyst particles has been regenerated to remove carbonaceous deposits prior to contact with said gas and liquid cleansing fluid.

4. The process of claim 3 wherein the liquid cleansing fluid is water.

5. The process of claim 3 wherein the gas is air and the liquid cleansing fluid is water.

6. The process of claim 5 wherein the flow of liquid cleansing fluid is shut off before the gas flow to prevent permanent catalyst bed expansion, the gas flow is continued upwardly through the liquid-containing catalyst bed until the catalyst bed has resettled and then the liquid in the bed is drained off from the reactor.

7. The process of claim 1 wherein the flow of liquid cleansing fluid upwardly through said bed of solid catalyst particles is at a mass velocity of about 4,000 to 12,000 pounds per hour per square foot of catalyst bed and the flow of gas concurrently upwardly through said bed of solid catalyst particles is at a volume velocity at the reactor outlet of about 1 to 4 cubic feet per minute per square foot of catalyst bed.

8. A process for washing and removing catalyst fines from a bed of solid particles of a hydrotreating catalyst for converting hydrocarbon oil stocks in a reactor while said bed of solid catalyst particles is in place in the reactor which comprises simultaneously flowing air and water concurrently upwardly through said bed of solid catalyst particles in place in the reactor at a rate sufficient to cause an expansion of said catalyst bed within the range of about 1 to 20% by volume, thereby intimately contacting the catalyst particles in said bed with the water and washing away catalyst fines, then shutting off the flow of water before the air flow to prevent permanent catalyst bed expansion, continuing the air flow upwardly through the water-containing catalyst bed until the catalyst bed has resettled, and then draining off the water in the bed from the reactor, and wherein the flow of water upwardly through said bed of solid catalyst particles is at a mass velocity of about 1,000 to 20,000 pounds per hour per square foot of catalyst bed and the flow of air concurrently upwardly through said bed of solid catalyst particles is at a volume velocity at the reactor outlet of about 0.5 to 10 cubic feet per minute per square foot of catalyst bed.

9. The process of claim 8 wherein the flow of water upwardly through said bed of solid catalyst particles is at a mass velocity of about 4,000 to 12,000 pounds per hour per square foot of catalyst bed and the flow of air concurrently upwardly through said bed of solid catalyst particles is at a volume velocity at the reactor outlet of about 1 to 4 cubic feet per minute per square foot of catalyst bed to cause an expansion of said catalyst bed within the range of about 1 to 10 percent by volume.

10. The process of claim 9 wherein said bed of solid catalyst particles has been regenerated, to remove carbonaceous deposits prior to contacting with said air and water.

11. The process of claim 10 wherein said hydrotreating catalyst in said bed is a hydrogenating catalyst of solid particles having diameters of about $\frac{1}{32}$ to $\frac{1}{4}$ inch with lengths of about $\frac{1}{32}$ to about $\frac{1}{2}$ inch.

References Cited

UNITED STATES PATENTS

| | | | |
|---|---|---|---|
| 2,780,585 | 2/1957 | Musslewhite et al. | 252—420 |
| 2,892,002 | 6/1959 | Summers | 209—474 |
| 3,085,070 | 4/1963 | Fowle et al. | 252—420 |

DANIEL E. WYMAN, Primary Examiner

P. E. KONOPKA, Assistant Examiner

U.S. Cl. X.R.

252—420, 412; 209—454, 474; 134—25